United States Patent [19]

Katz

[11] Patent Number: 5,764,451
[45] Date of Patent: Jun. 9, 1998

[54] MULTI-TAPPED COIL HAVING TAPPED SEGMENTS CASADED FOR AMPLIFICATION FOR IMPROVING SIGNAL-TO-NOISE RATIO

[75] Inventor: Eric R. Katz, San Jose, Calif.

[73] Assignee: Read-Rite Corporation, Milpitas, Calif.

[21] Appl. No.: 963,817

[22] Filed: Nov. 4, 1997

Related U.S. Application Data

[63] Continuation of Ser. No. 623,233, Mar. 28, 1996, abandoned.

[51] Int. Cl.$^6$ .................................. G11B 5/02; G11B 5/17
[52] U.S. Cl. .................................. 360/123; 360/67
[58] Field of Search .................................. 360/67, 68, 108, 360/113, 123, 125, 126

[56] References Cited

U.S. PATENT DOCUMENTS

| | | | |
|---|---|---|---|
| 4,040,113 | 8/1977 | Gorter | 360/113 |
| 4,691,259 | 9/1987 | Imakoshi et al. | 360/113 |
| 4,825,318 | 4/1989 | Hoo et al. | 360/123 |
| 5,079,663 | 1/1992 | Ju et al. | 360/113 |
| 5,124,870 | 6/1992 | Toyoda | 360/126 |
| 5,142,425 | 8/1992 | Gailbreath, Jr. et al. | 360/123 |
| 5,216,561 | 6/1993 | Jagielinski | 360/113 |
| 5,218,497 | 6/1993 | Tanabe et al. | 360/126 |
| 5,309,295 | 5/1994 | Bailey et al. | 360/67 |

*Primary Examiner*—Jefferson Evans
*Attorney, Agent, or Firm*—Nathan N. Kallman

[57] ABSTRACT

A magnetic head includes an inductive coil electrically partitioned into a plurality of segments by a plurality of conductive leads. During the data reading mode, magnetic flux changes emanating from a record medium are sensed by the magnetic head. The inductive coil transduces the magnetic flux changes into electrical signals at the conductive leads. The signals are amplified by serially cascading the plurality of segments and the signals are then fed into amplifiers. During the data writing mode, the electrical signal is applied to two of the conductive leads via a data writing amplifier. The inductive coil converts the electrical signal into changes in magnetic flux for recording onto a magnetic medium.

10 Claims, 6 Drawing Sheets

| | DATA RATE (MB/SEC.) | NUMBER OF COIL SEGMENTS | NUMBER OF WINDINGS PER SEGMENT | INDUCTANCE PER SEGMENT ($\mu H$) | RESISTANCE PER SEGMENT (OHM) | RESONANT FREQUENCY (MHz) | SIGNAL AMPLITUDE, PP ($\mu V$) | NOISE AMPLITUDE, RMS ($\mu V$) | SNR |
|---|---|---|---|---|---|---|---|---|---|
| O.D. | 200 | 1 | 42 | 500 | 30 | 90 | 900 | 25.01 | 35.98 |
| | 200 | 2 | 21 | 125 | 15 | 196 | 900 | 14.65 | 61.44 |
| | 200 | 3 | 14 | 55.6 | 10 | 302 | 900 | 15.08 | 59.48 |
| I.D. | 100 | 1 | 42 | 500 | 30 | 90 | 450 | 10.39 | 43.32 |
| | 100 | 2 | 21 | 125 | 15 | 196 | 450 | 9.4 | 47.86 |
| | 100 | 3 | 14 | 55.6 | 10 | 302 | 450 | 10.49 | 42.90 |

| | DATA RATE (MB/SEC.) | NUMBER OF COIL SEGMENTS | NUMBER OF WINDINGS PER SEGMENT | INDUCTANCE PER SEGMENT ($\mu$H) | RESISTANCE PER SEGMENT (OHM) | RESONANT FREQUENCY (MHz) | SIGNAL AMPLITUDE, PP ($\mu$V) | NOISE AMPLITUDE, RMS ($\mu$V) | SNR |
|---|---|---|---|---|---|---|---|---|---|
| O.D. | 200 | 1 | 69 | 1350 | 49.2 | 53 | 1479 | 41.07 | 36.01 |
| O.D. | 200 | 3 | 23 | 150 | 16.4 | 178 | 1479 | 19.19 | 77.60 |
| I.D. | 100 | 1 | 69 | 1350 | 49.2 | 53 | 739 | 17.08 | 43.26 |
| I.D. | 100 | 3 | 23 | 150 | 16.4 | 178 | 739 | 11.86 | 62.30 |

MULTI-TAPPED COIL HAVING TAPPED SEGMENTS CASADED FOR AMPLIFICATION FOR IMPROVING SIGNAL-TO-NOISE RATIO

This application is a continuation of application Ser. No. 08/623,233, filed Mar. 28, 1996, now abandoned.

FIELD OF THE INVENTION

This invention relates to a magnetic head having a coil which is multi-tapped with electrical leads allowing sensed signal from the coil to be amplified by serially cascading the electrical leads.

BACKGROUND OF THE INVENTION

Heretofore, magnetic recording media in the form of tapes or disks have been widely used for informational storage, due mainly to their massive storage capacities and cost effectiveness. To interact with these magnetic recording media, magnetic transducers are commonly employed to perform the tasks.

A typical thin-film magnetic transducer comprises an inductive coil sandwiched between two magnetic poles. The two magnetic poles come into direct contact with each other at one end, and form a narrow transducing gap at another end. During the data writing mode, electrical current with information passes through the inductive coil. The current carrying coil induces magnetic flux into the magnetic poles. The induced magnetic flux flows through the poles along the magnetic path, reaching the transducing gap and magnetizes a moving recording medium disposed close by. During the data reading mode, magnetic flux emanating from the recorded medium is sensed by the transducing gap. The magnetic flux flows along the magnetic path defined by the two magnetic poles and induces electrical current in the inductive coil. The induced current in the coil corresponds to the data content stored in the recording medium.

The tendency in present day technology is to fabricate recording media with high data capacities and of smaller size. It is known that with such characteristics, the recorded data tracks emanate weaker magnetic flux. Signals sensed by the magnetic transducer are correspondingly diminished. Consequently, a conventional magnetic read head is susceptible to pick up undesirable noise signal. The noise signal adversely affects the data signal, thereby degrading the overall signal-to-noise ratio (SNR) of the magnetic head. Higher data recording density per track coupled with higher rotating velocity of the disk demand higher bandwidth capability from the magnetic head. With a large inductive head, the prior art transducers may not be responsive enough to operate in high frequency environments.

To reduce such problems, various techniques have been suggested. One such technique is to increase the number of coil windings in the magnetic head in an effort to enhance the signal sensing capability. The problem with this approach is that the inductance of the magnetic head is also accordingly increased. As is well known in the art, an increase in inductance of the coil correspondingly results in an increase in reactance of the magnetic head, and consequently slows the response time. To compensate for the increase in inductance, attempts have been made to modify the geometrical feature of the magnetic head by reducing the yoke width, increasing the pole-to-pole separations, or minimizing the throat height of the magnetic head. None of these techniques have demonstrated any satisfactory working results.

SUMMARY OF THE INVENTION

It is an object of the invention to provide a magnetic head with high sensitivity to signal and high signal-to-noise ratio.

It is another object of the invention to provide a magnetic head for operation with wide bandwidth data signals and capable of interacting with recording media having narrow track widths, high linear recording densities and fast operational speed.

It is yet another object of the invention to provide a magnetic head with simplicity in design and reduction in processing steps, thereby reducing manufacturing costs.

According to this invention, a magnetic head comprises an inductive coil with a plurality of conductive leads, wherein the coil is electrically partitioned into a plurality of segments. During data reading, signals are reconstructed by cascading the segments, and then fed to associated amplifiers for amplification. During data writing, electrical signals are directed into only one of the segments, which in turn induces magnetic flux for magnetization onto the recording medium.

The magnetic head built in accordance with the invention is substantially lower in inductance with improved signal sensing capability. As a consequence, the inventive magnetic head is capable of detecting weak electrical signals emanating from narrow data tracks with high linear recording densities, and with low noise susceptibility. The frequency response is also improved, due to increase in both agility and resonant frequency.

These and other features and advantages of the invention will be apparent to those skilled in the art from the following detailed description, taken together with the accompanying drawings, in which like reference numerals refer to like parts.

DETAILED DESCRIPTION OF THE INVENTION

Figure 1:
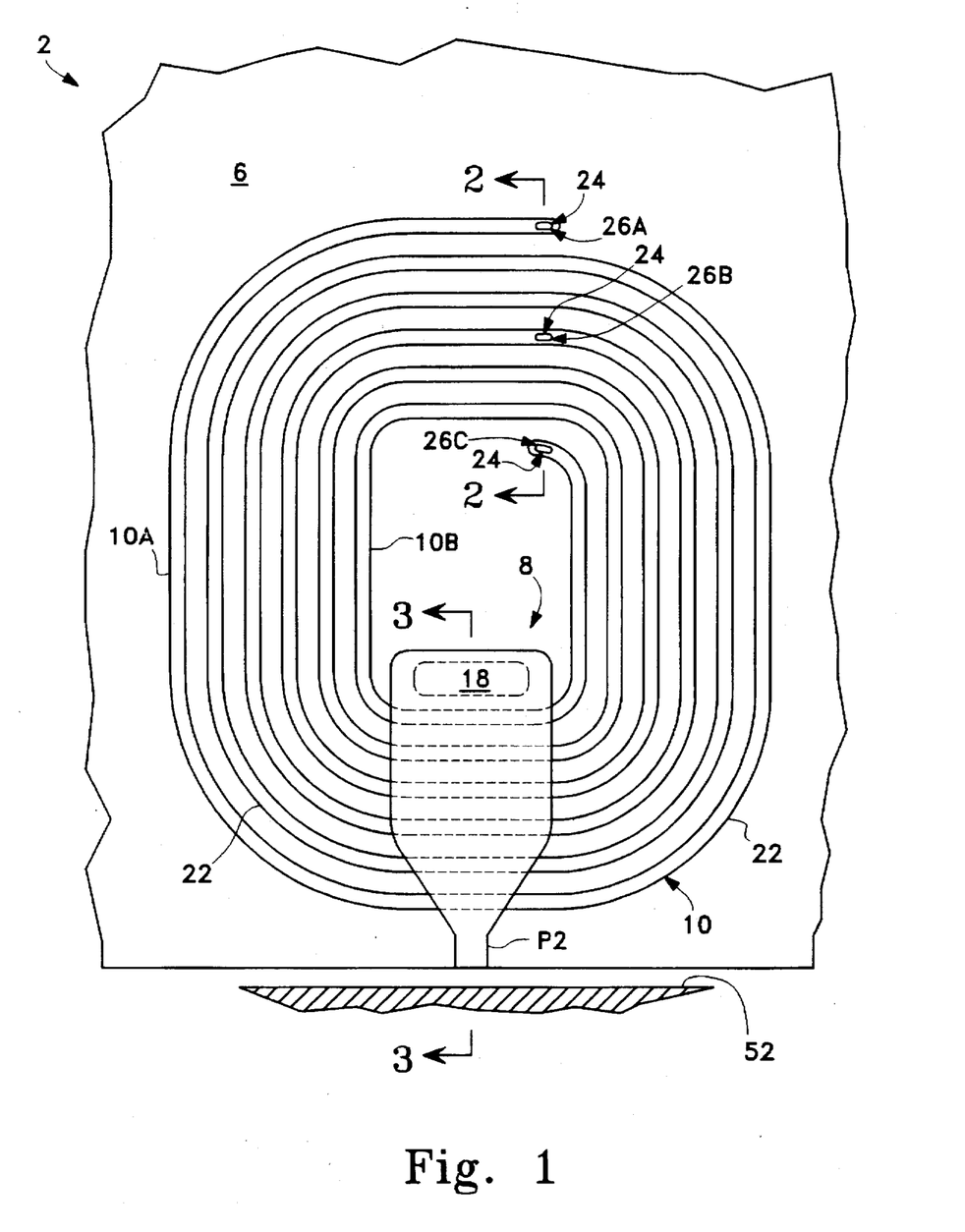
FIG. 1 is a top plan view of the magnetic head of the invention having the top protective layers removed to expose all relevant components.
Figures 2, 3:
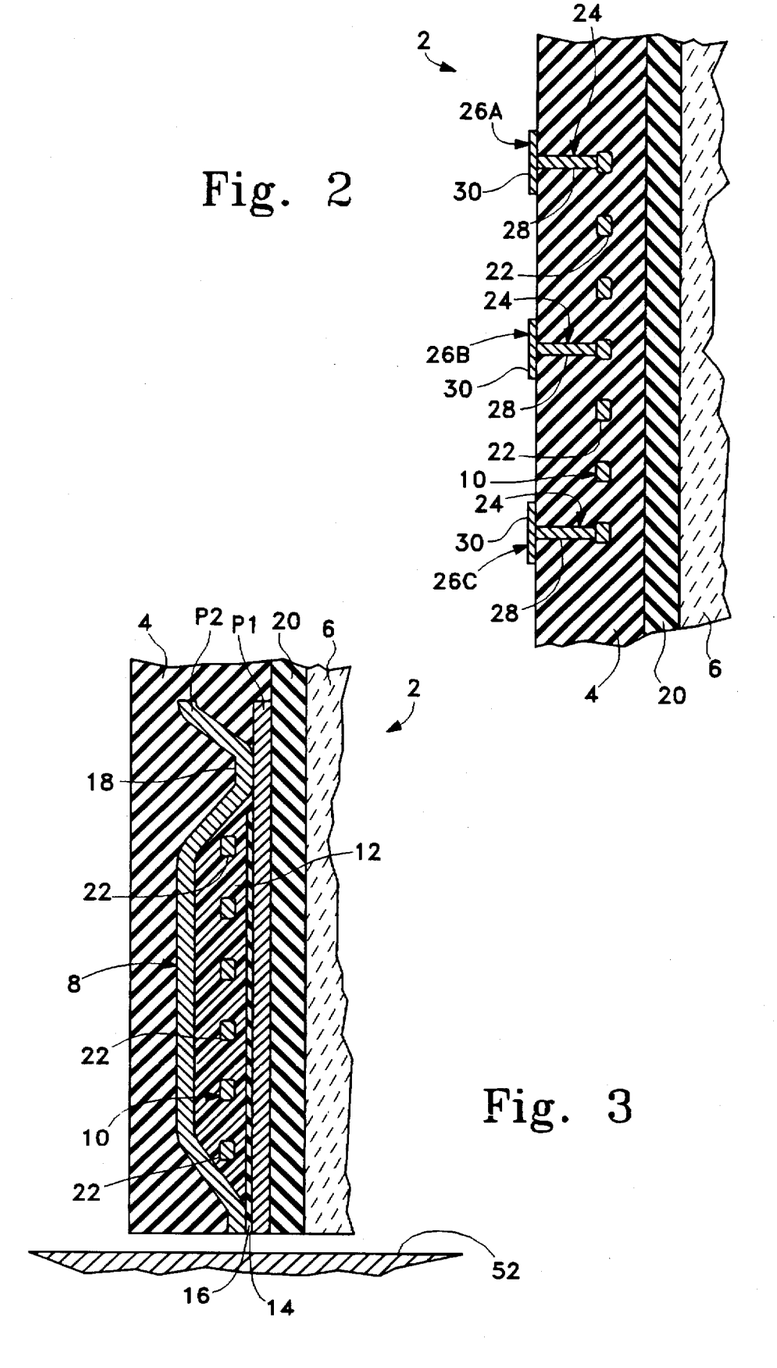
FIG. 2 is a cross-sectional side view partly broken away, and taken along line 2—2 of FIG. 1.
FIG. 3 is a cross-sectional side view taken along the line 3—3 of FIG. 1.

With reference to FIGS. 1–3, a magnetic transducer 2 includes a protective overcoat layer. For the sake of illustration, the protective layer 4 is not shown in FIG. 1 to expose the relevant components.

The transducer 2 is a multi-layer structure formed on a substrate 6. The substrate 6 is preferably made of a non-magnetic and nonconducting material, such as ceramic. The transducer 2 is formed with a yoke 8 comprising two magnetic poles P1 and P2 normally made of a material having a high permeability and a low coercive force, such as Permalloy (NiFe). Disposed between the two magnetic poles P1 and P2 is an electrically conductive coil 10, insulated by an interposing insulating material 12. At one end, poles P1 and P2 are separated by an insulating layer 14 which defines a read-write transducing gap 16. At the other end, the poles P1 and P2 are joined together at a back closure region 18. A dielectric layer 20 is disposed between the pole P1 and the substrate 6.

The coil 10 assumes a planar structure which includes a plurality of windings 22. It should be noted there are only six windings shown in FIGS. 1–3 for the sake of clarity in illustration. In actual applications, the number of coil windings 10 can be substantially higher. Connected to the coil 10 is conductive means 24. In this embodiment, conductive means 24 is implemented in the form of electrical leads 26A–26C. For example, as shown in FIG. 2, each of the electrical leads 26A–26C includes an electrical interconnection 28 disposed between a coil winding 22 and a bonding pad 30. Electrical leads 26A–26C, alternatively called electrical taps, allow the coil 10 to electrically communicate with other circuitry as explained below.

Figure 4:
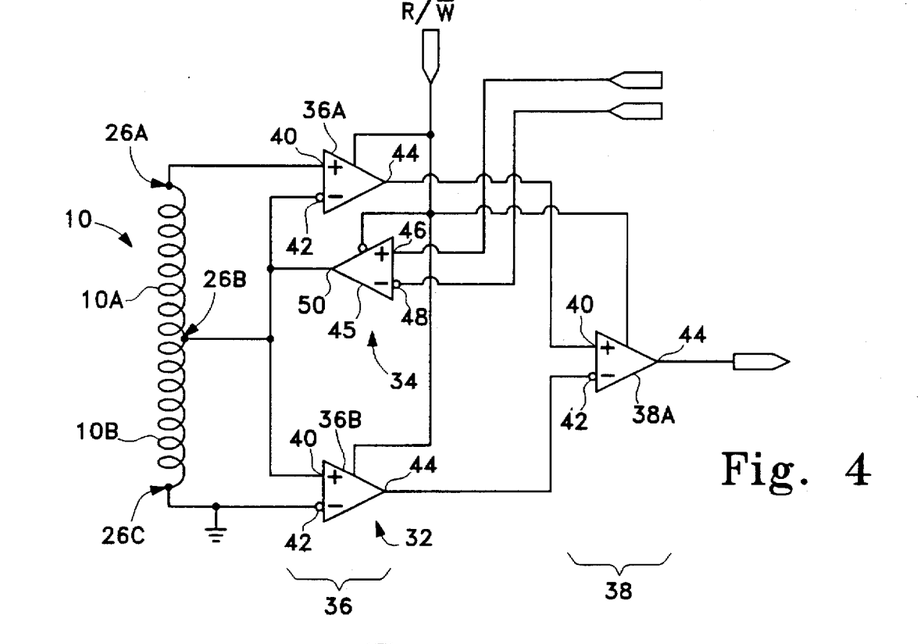
FIG. 4 is a schematic drawing of the inventive magnetic head illustrating the electrical connections between the inductive coil and the data reading and writing circuits.

Shown in FIG. 4 is schematic drawing of the coil tied to data reading and writing circuits 32 and 34, respectively. In this embodiment, the reading circuit 32 includes two stages of amplifiers, namely, a first stage 36 and a second stage 38. Each amplifier in the amplifier stages 36 and 38 is a differential amplifier having at least two differential inputs 40 and 42 and an output 44. Included in the first stage 36 are amplifiers 36A and 36B. Each differential input 40 or 42 is electrically connected to one of the conductive leads 26A–26C. For example, the assertive input 40 of the amplifier 36A is connected to the electrical lead 26A, while the complementary input 42 of the amplifier 36A is connected to the electrical lead 26B. In a similar manner, the assertive and complementary inputs 40 and 42 of the amplifier 36B are connected to the electrical lead 26B and 26C, respectively. Furthermore, each input of the amplifiers in the second amplifier stage 38 is connected to the output of one of the amplifiers in the first amplifier stage 36. In this embodiment, the second stage 38 consists of only one output amplifier 38A in which the assertive and complementary inputs 40 and 42 are tied to the outputs 44, respectively, of the amplifiers 36A and 36B in the first amplifier stage 36.

The data writing circuit 34 in this embodiment includes a data writing amplifier 45 also having at least assertive and complementary inputs 46 and 48 and an output 50. The output 50 of the amplifier 45 is connected to the conductive lead 26B.

The switching of the data reading mode to the data writing mode, or vice versa, is made possible by toggling a read-write input R/W̄. When the input R/W̄ is at a logic high for example, all amplifiers, except the data writing amplifier 45, are enabled. Conversely, when the R/W̄ input is at a logic low, only the data writing amplifier 45 is enabled and all other amplifiers are disabled.

If the magnetic head 2 is operated in the data reading mode, the read-write input R/W̄ is first switched to a logic high. Magnetic flux emanating from a record medium 52 sensed by the read-write gap 16 (FIG. 3), flows through the magnetic poles P1 and P2 and then into the inductive coil 10. Changes in magnetic flux correspondingly induces electrical current in the coil 10, which constitutes the information read out from the record medium 52.

As is well known in the art, the inductance of a coil increases with the square of the number of coil windings. With data tracks having narrower track widths and denser recorded densities, a coil with a larger number of windings is required to detect the weaker flux emanating from the fine data tracks.

However, a large coil with the associated large inductance presents a severe limitation in high frequency operations. It is also known that when magnetic flux impinges upon an inductive coil, the inductive coil develops a back electromotive force (EMF) opposing any flux change, in accordance with Lenz's law. As mentioned before, in new generations of storage media, data tracks are packed with high density information. Even at a reasonable moving speed of the record medium, the magnetic head must be capable of operating at a high frequency to fully detect the recorded data. A magnetic head slow in frequency response would be a major handicap in high frequency operations.

In the magnetic head 2 of the invention, the coil 10 is electrically partitioned into two segments 10A and 10B (FIG. 4) by the electrical leads 26A–26C. Each segment 10A or 10B has only half the number of windings as the full coil 10. As mentioned before, the inductance decreases with the reciprocal of the square of the number of coil windings. Accordingly, the inductance of each segment 10A or 10B is reduced to one fourth of the full coil 10. With substantially lower inductance, back EMF is less of a problem and the coil 10 is now more responsive to signal changes. Pin effect, the operating bandwidth of the coil 10 is increased, due to the decrease in inductance. A large coil with multiple windings is no longer a problem in high frequency applications. Signals sensed by each segment 10A or 10B can be cascaded serially and fed to the amplifier stages 36 and 38 for reconstruction and amplification, as shown in FIG. 4. It should be emphasized that only the sensed signals are superimposed, reconstructed and amplified. Since noise occurs randomly in each coil segment 10A and 10B, noise amplitudes cannot be superimposed. The overall effect is a distinctive improvement in SNR. Furthermore, the resonant frequency of the coil 10 is also increased. It should be noted that the inductance of the coil 10, and the parasitic capacitances of the coil form a tank circuit with a characteristic resonant frequency. This resonant frequency is found to be inversely proportional to the square root of the product of the inductance and capacitance. With other parameters being constant, reduction in inductance of the coil 10 raises the resonant frequency of the magnetic head 2. A magnetic head 2 with higher resonant frequency is less prone to oscillate. An oscillating magnetic head is detrimental to overall head performance.

In operation, the read-write input R/W̄ is switched to a logic low which directs the magnetic head 2 to enter into the data writing mode. Electrical signals are first fed into the data writing amplifier 45 via the inputs 46 and 48. The current drive circuit (not shown) inside the amplifier 45 converts the electrical signals into data writing current and which flows into the segment 10B of the coil 10. Essentially, the writing current flows from the electrical leads 26B to the ground terminal, which is also the electrical lead 26C in this case. Again, the amplifier 45 now only has to deal with the coil segment 10B with much lower inductance, in comparison with the full coil 10. Current supplied by the current drive circuit (not shown) inside the amplifier 45 theoretically can be any value, thereby eliminating any concerns of weak writing signals. With low inductance in the coil segment 10B, in contrast with a full coil, the bandwidth of the writing circuit 34 is substantially widened, resulting in faster data writing time for the magnetic head 2. Current with information passing through the coil segment 10B induces magnetic flux into the magnetic poles P1 and P2. The induced magnetic flux flows through the magnetic path of the poles P1 and P2 to the read-write gap 16 and magnetizes record medium 52 (FIG. 3).

Figure 5:
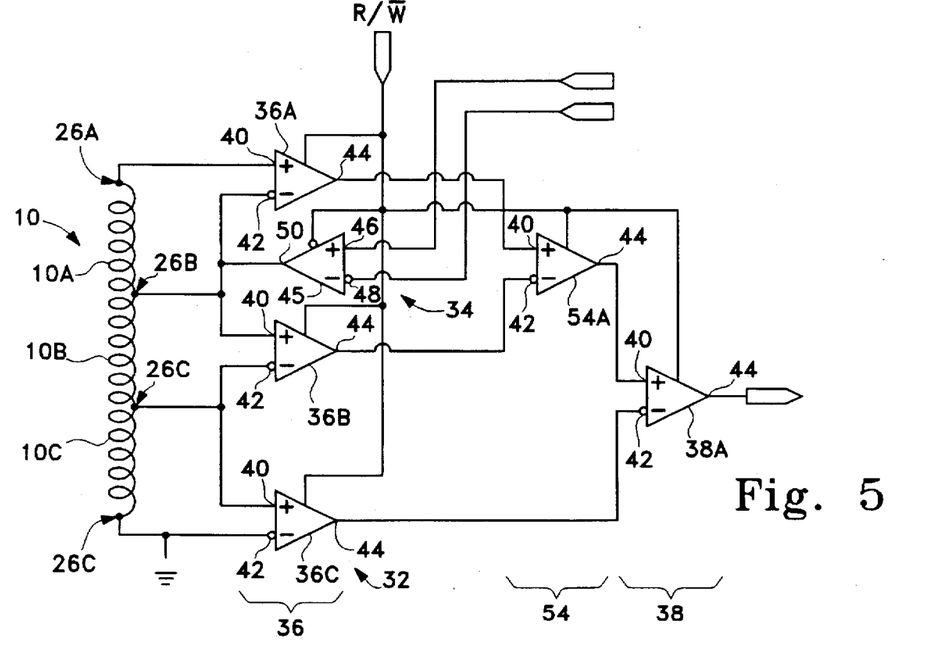
FIG. 5 is a schematic drawing of another embodiment of the inventive magnetic head illustrating the electrical connections between the inductive coil and the data reading and writing circuits.

In a second embodiment of the invention, shown in FIG. 5, coil 10 is divided into segments 10A–10C by electrical leads 26A–26D. An intermediate stage of amplifiers 54 is disposed between the first and second stages of amplifiers 36 and 38. The assertive and complementary inputs 40 and 42 of the amplifier 54A of the intermediate stage 54 is connected to the output 40 of one of the amplifiers 36A–36D of the first stage 36. The output 44 of the amplifier 54A is connected to the assertive input 40 of the amplifier 38A in the first stage 38. The operational details of this embodiment are substantially the same as for the previous embodiment. For the sake of conciseness, the operational description for this embodiment is not repeated.

It should also be noted that there can be more than one intermediate stage of amplifiers 54. A plurality of intermediate stages of amplifiers can be placed between and electrically connected to the first and second stages 36 and 38, respectively.

The inventive magnetic head can be fabricated by conventional thin-film processes commonly employed by the microelectronic industry.

Figure 6:
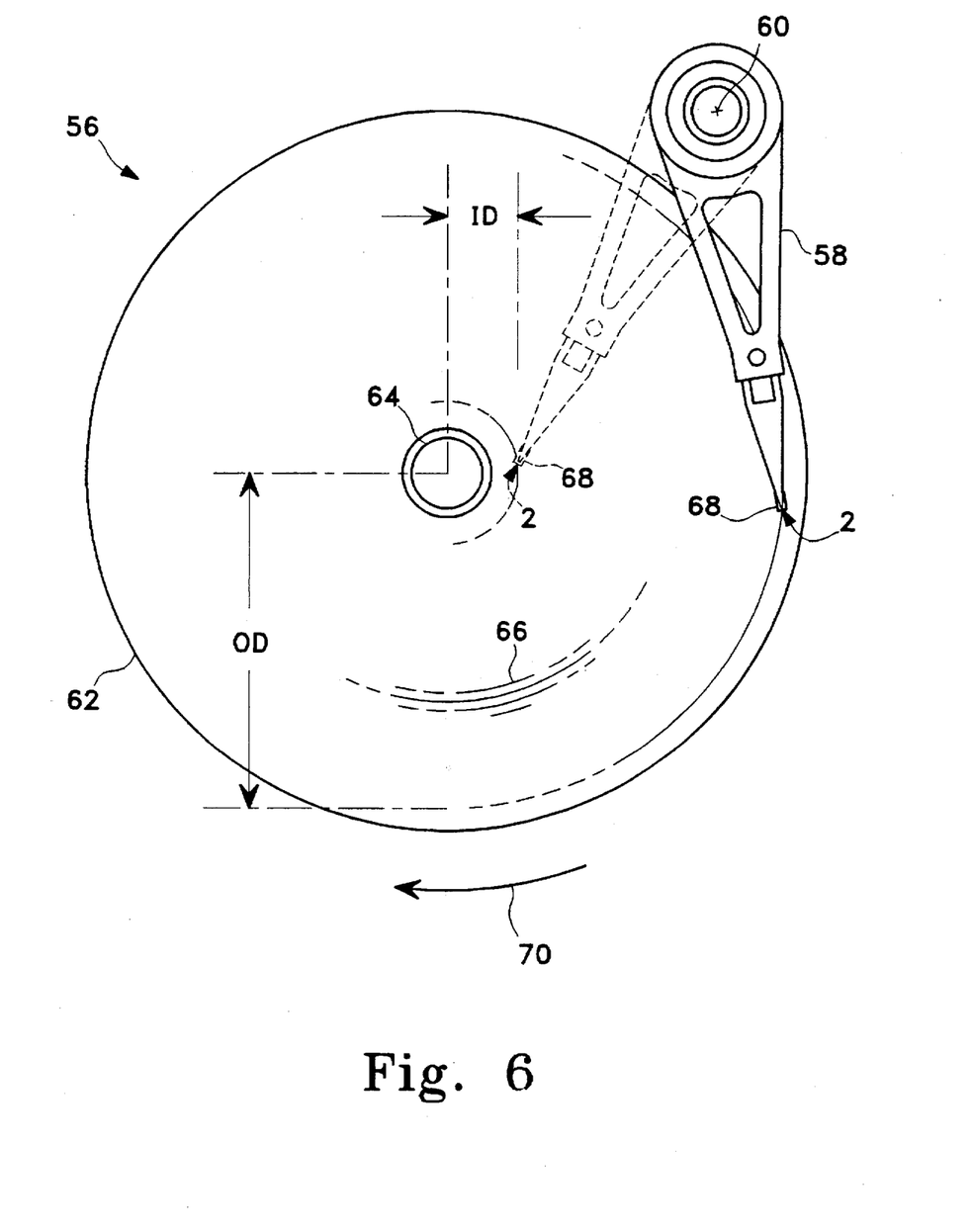
FIG. 6 is the top plan view showing schematically a testing arrangement for evaluating performance of magnetic heads.

Extensive measurements have been conducted to evaluate the performance of the magnetic head of the invention. Shown in FIG. 6 is an arrangement set up for the evaluation purpose. FIG. 6 is a schematic top plan view of a magnetic disk drive 56 having an arm 58 pivotable about an arm axis 60, and a magnetic disk 62 rotatable about a spindle 64. A multiplicity of concentric data tracks 66 are registered on the surface of the disk 62. Attached to the distal end of the arm 58 is an air bearing slider 68 carrying the magnetic head 2 of the invention which interacts with the magnetic disk 62. During normal operation, the disk 62 spins at high speed in a rotational direction 70. The aerodynamics of the moving air between the slider 68 and the surface of the disk 62 provides sufficient air cushioning to suspend the slider 68 above the disk surface. Data are read on both the inner diameter track ID and the outer diameter track OD of the disk 62. The results are tabulated and analyzed.

Figure 7:
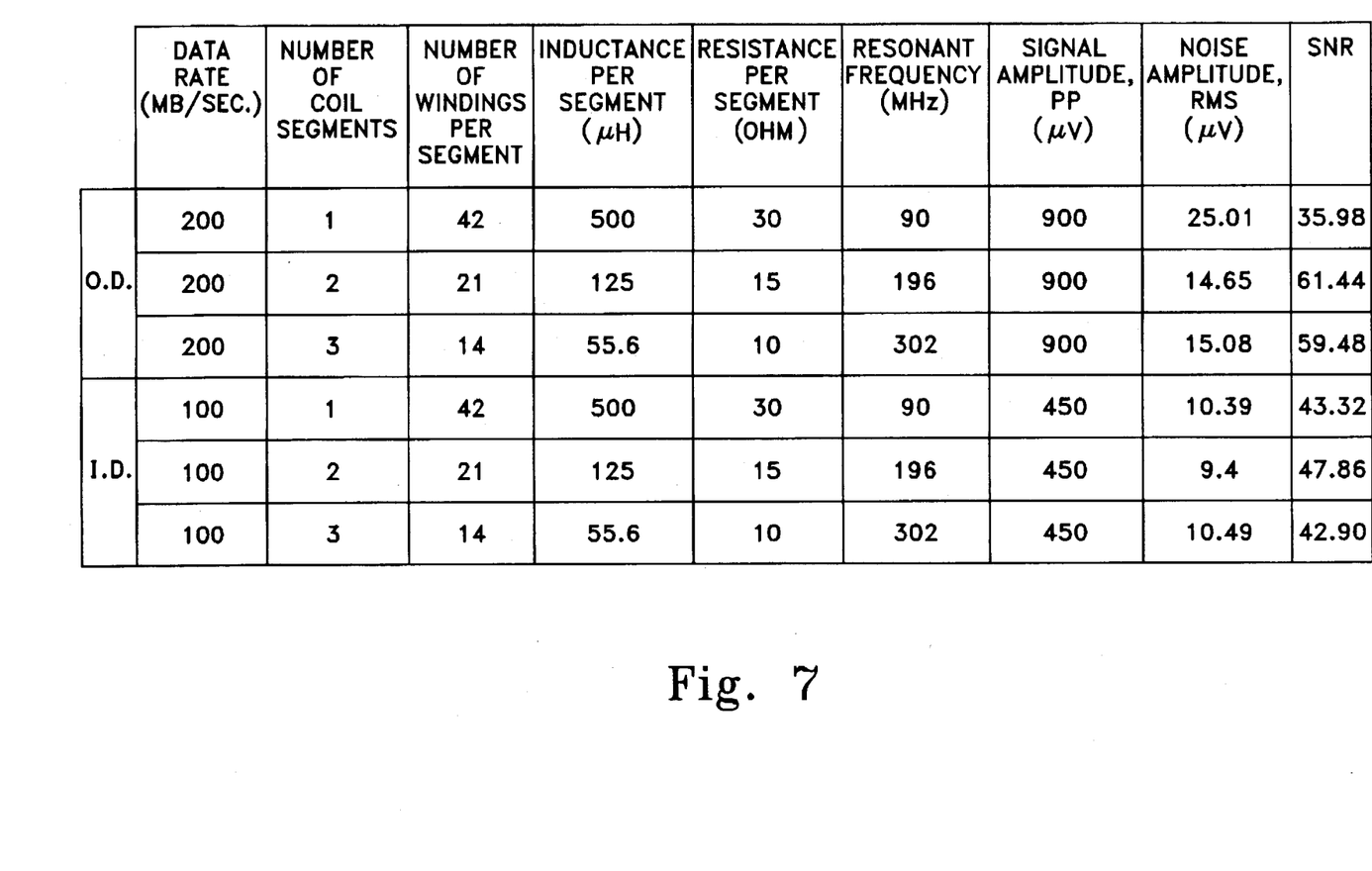
FIG. 7 is a tabulated chart summarizing the results of testing as performed by the testing arrangement as shown in FIG. 6 for a magnetic coil having 42 windings.

FIG. 7 illustrates the test results of a magnetic head having an inductive coil with 42 turns. The magnetic head is tested with the coil electrically partitioned into 1 to 3 segments. As can be shown in FIG. 7, from a partition of 3 segments to no partition at all, there is at least a threefold increase in resonant frequency and a 65% increase in SNR, when the data in the outer diameter track OD is retrieved. While interacting with the inner diameter track ID, there is not much improvement in SNR, probably due to the different orientation of the slider 68 with respect to the data track, which in turn affects the flying height of the magnetic head 2 with respect to the surface of the disk 62. The larger flying height may mask out the benefits offered by the multi-tapped coil 10 of the invention. However, when the number of windings in the coil 10 is increased, the advantage is more clearly evident.

Figure 8:
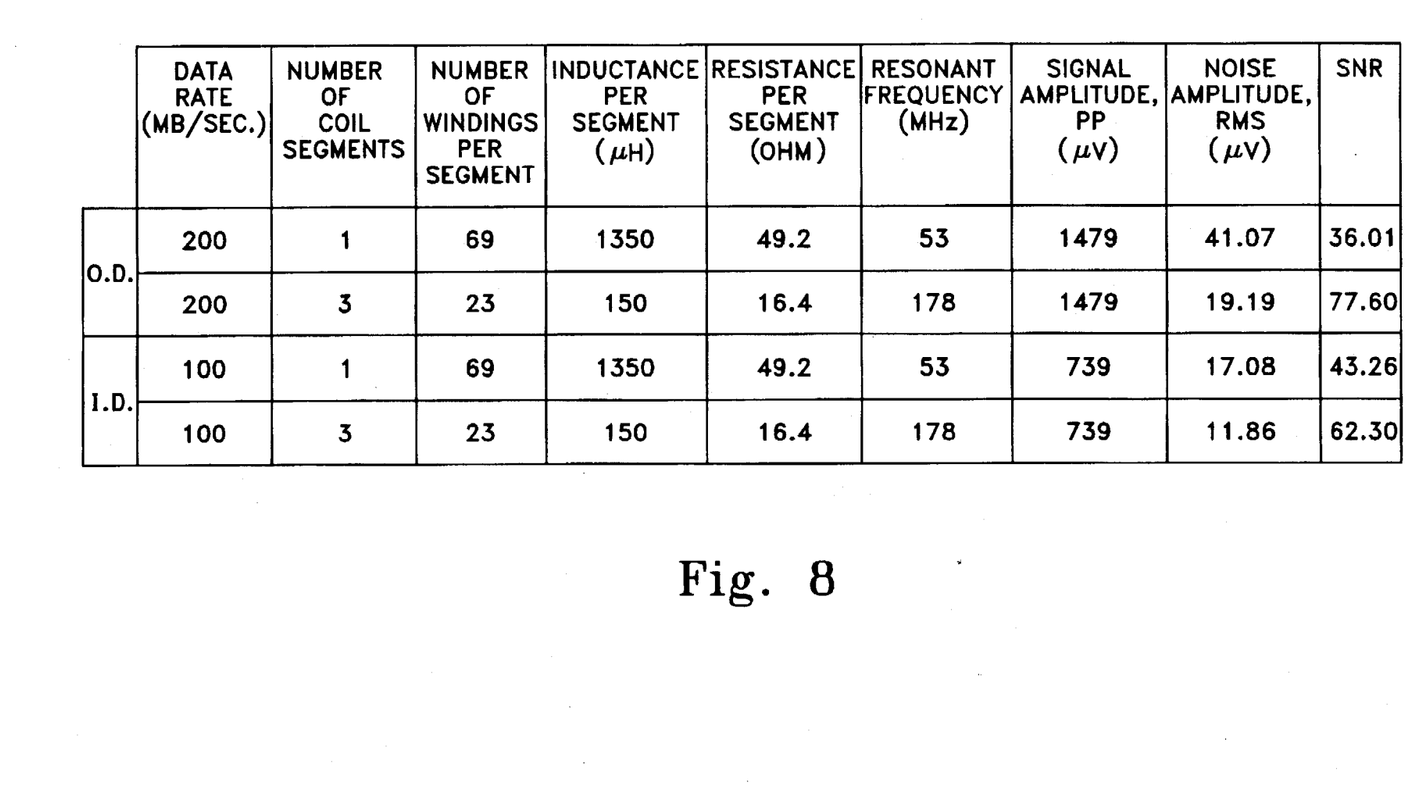
FIG. 8 is a tabulated chart summarizing the results of testing as performed by the testing arrangement as shown in FIG. 6 for a magnetic coil having 69 windings.

FIG. 8 illustrates the test results of a magnetic head having an inductive coil 10 with 69 turns. The magnetic head 2 is tested with the coil electrically partitioned into 1 and 3 segments. As shown in FIG. 8, from a partition of 3 segments to no partition at all, there is at least a threefold increase in resonant frequency and a 114% increase in SNR, when the data in the outer diameter track OD is retrieved. While interacting with the inner diameter track ID, the increase in SNR is 44%.

It should be understood that various changes may be made within the scope of the invention. The conductive means 24 can assume other forms of implementation other than the electrical leads described. For instance, electrical wires can be directly soldered onto the coil 10 for electrical partitioning. Moreover, the coil 10 can be shaped with integral coil branches which can perform the same functions of the electrical leads. In addition, the number of segments need not be restricted to two or three as described. Theoretically, the number of electrical leads can be any number N partitioning the coil 10 into (N−1) segments, where N is an integer. Furthermore, the segments need not be of equal lengths. These and other changes in form and detail may be made therein without departing from the scope and spirit of the invention.

What is claimed is:

1. A magnetic head assembly comprising:
   a transducer structure having only a first pole and a second pole with only a single transducing gap between the tips of said poles;
   a single continuous electrical coil disposed between and insulated from said two poles;
   a plurality of conductive leads electrically connected to said coil, said conductive leads being disposed at preselected locations along said coil, said conductive leads electrically partitioning said coil into a plurality of segments; and
   a first stage having a plurality of serially cascaded and interconnected amplifiers with assertive and complementary inputs and a second stage having at least one amplifier, said first stage of amplifiers being electrically connected to and disposed between said conductive leads and said second stage
   wherein at least one of said conductive leads is coupled to said inputs.

2. The magnetic head as set forth in claim 1 wherein each of the amplifiers in said first and second stages comprise at least two differential inputs and an output, the differential inputs to the amplifiers in said first stage being electrically connected to one of said conductive leads, the differential inputs of said at least one amplifier in said second stage being electrically connected to the output of one of the amplifiers in said first stage.

3. The magnetic head assembly as set forth in claim 1 further including a data writing amplifier having an output electrically connected to one of said conductive leads such that during a data writing mode, electrical signals are applied to said coil through said writing amplifier for allowing the electrical signals to be converted into changes in magnetic flux for recording onto said medium.

4. A magnetic head assembly for converting changes in magnetic flux from a recording medium into electrical signals during a data reading mode, and for converting electrical signals into changes in magnetic flux onto the recording medium during a data writing mode comprising:
   a transducer structure having only a first pole and a second pole with only a single transducing gap between the tips of said poles;
   a single continuous electrical inductive coil disposed between and insulated from said two poles;

a plurality of conductive leads electrically connected to said inductive coil, said conductive leads being disposed at preselected locations along said coil for electrically partitioning said coil into a plurality of serially cascaded segments; and a first stage having a plurality of amplifiers and a second stage having at least one amplifier, each of the amplifiers in said stages having at least two differential inputs and an output, the differential inputs of the amplifiers in said first stage being electrically connected to one of said conductive leads, the differential inputs of said at least one amplifier in said second stage being electrically connected to the output of one of the amplifiers in said first stage;

wherein during the data reading mode, changes in magnetic flux sensed by said coil are converted into electrical signals at said conductive leads, so that by cascading said segments serially via said electrical leads, and passing the electrical signals from said electrical leads through said second stage via said first stage of amplifiers, said electrical signals are amplified.

5. The magnetic head assembly as set forth in claim 4 further including a data writing amplifier having an output electrically connected to one of said conductive leads, wherein during the data writing mode, electrical signals are applied to said coil through said writing amplifier, thereby converting the electrical signals into changes in magnetic flux for recording on said medium.

6. The magnetic head assembly as set forth in claim 4 wherein said second stage includes only one amplifier.

7. A magnetic head assembly comprising:

a transducer structure having only a first pole and a second pole with only a single transducing gap between the tips of said poles;

a single continuous electrical coil disposed between and insulated from said two poles;

a plurality of conductive leads electrically connected to said coil, said conductive leads being disposed at preselected locations along said coil, said conductive leads electrically partitioning said coil into a plurality of segments; and a first stage having a plurality of amplifiers and a second stage having at least one amplifier, said first stage of amplifiers being electrically connected to and disposed between said conductive leads and said second stage;

wherein each of the amplifiers in said first and second stages comprise at least two differential inputs and an output, the differential inputs to the amplifiers in said first stage being electrically connected to one of said conductive leads, the differential inputs of said at least one amplifier in said second stage being electrically connected to the output of one of the amplifiers in said first stage;

further including an intermediate stage of amplifiers disposed between said first and second stages of amplifiers, each of the differential inputs of the amplifiers in said intermediate stage being electrically connected to the output of one of the amplifiers in said first stage, and each of the differential inputs of said at least one amplifier in said second stage being electrically connected to the output of one of the amplifiers in said intermediate stage.

8. The magnetic head assembly as set forth in claim 7 wherein said second stage comprises only one amplifier.

9. The magnetic head assembly as set forth in claim 8 further including a data writing amplifier having an output electrically connected to one of said conductive leads.

10. A magnetic head assembly for converting changes in magnetic flux from a recording medium into electrical signals during a data reading mode, and for converting electrical signals into changes in magnetic flux onto the recording medium during a data writing mode comprising:

a transducer structure having only a first pole and a second pole with only a single transducing gap between the tips of said two poles;

a single continuous electrical inductive coil disposed between and insulated from said poles;

a plurality of conductive leads electrically connected to said inductive coil, said conductive leads being disposed at preselected locations along said coil for electrically partitioning said coil into a plurality of serially cascaded segments;

a first stage having a plurality of amplifiers and a second stage having at least one amplifier, each of the amplifiers in said stages having at least two differential inputs and an output, the differential inputs of the amplifiers in said first stage being electrically connected to one of said conductive leads, the differential inputs of said at least one amplifier in said second stage being electrically connected to the output of one of the amplifiers in said first stage;

wherein during the data reading mode, changes in magnetic flux sensed by said coil are converted into electrical signals at said conductive leads, so that by cascading said segments serially via said electrical leads, and passing the electrical signals from said electrical leads through said second stage via said first stage of amplifiers, said electrical signals are amplified;

further including a data writing amplifier having an output electrically connected to one of said conductive leads, wherein during the data writing mode, electrical signals are applied to said coil through said writing amplifier, thereby converting the electrical signals into changes in magnetic flux for recording on said medium;

wherein said second stage includes only one amplifier;

further including an intermediate stage of amplifiers disposed between said first stage of amplifiers and said output amplifier, each of the differential inputs of the amplifiers in said intermediate stage being electrically connected to the output of one of the amplifiers in said first stage, and one of the differential inputs of said output amplifier being electrically connected to the output of one of the amplifiers in said intermediate stage.

* * * * *